United States Patent [19]
Fischer et al.

[11] Patent Number: 5,648,437
[45] Date of Patent: Jul. 15, 1997

[54] PROCESS FOR THE MANUFACTURE OF THERMOPLASTIC POLYCARBONATE

[75] Inventors: Thomas Fischer, Krefeld; Rolf Bachmann, Gladbach; Uwe Hucks, Alpen; Franz Ferdinand Rhiel, Dormagen; Steffen Kühling, Meerbusch, all of Germany

[73] Assignee: Bayer Aktiengesellschaft, Germany

[21] Appl. No.: 618,614

[22] Filed: Mar. 20, 1996

[30] Foreign Application Priority Data

Mar. 29, 1995 [DE] Germany .................. 195 11 483.3

[51] Int. Cl.$^6$ .................................................. C08F 2/00
[52] U.S. Cl. .................... 526/64; 528/168; 528/196; 528/198; 528/483; 528/484

[58] Field of Search .......................... 528/168, 196, 528/198, 483, 484, 204; 526/64

[56] References Cited

U.S. PATENT DOCUMENTS 5,384,389   1/1995   Alewelt et al. ..................... 528/168

FOREIGN PATENT DOCUMENTS 2153923   6/1988   Japan .

*Primary Examiner*—Terressa Mosley

[57] ABSTRACT

The present invention provides a melt process for the manufacture of thermoplastic solvent-free polycarbonates with the use of a continuously operated tubular reactor for monophenol vaporization.

3 Claims, 1 Drawing Sheet

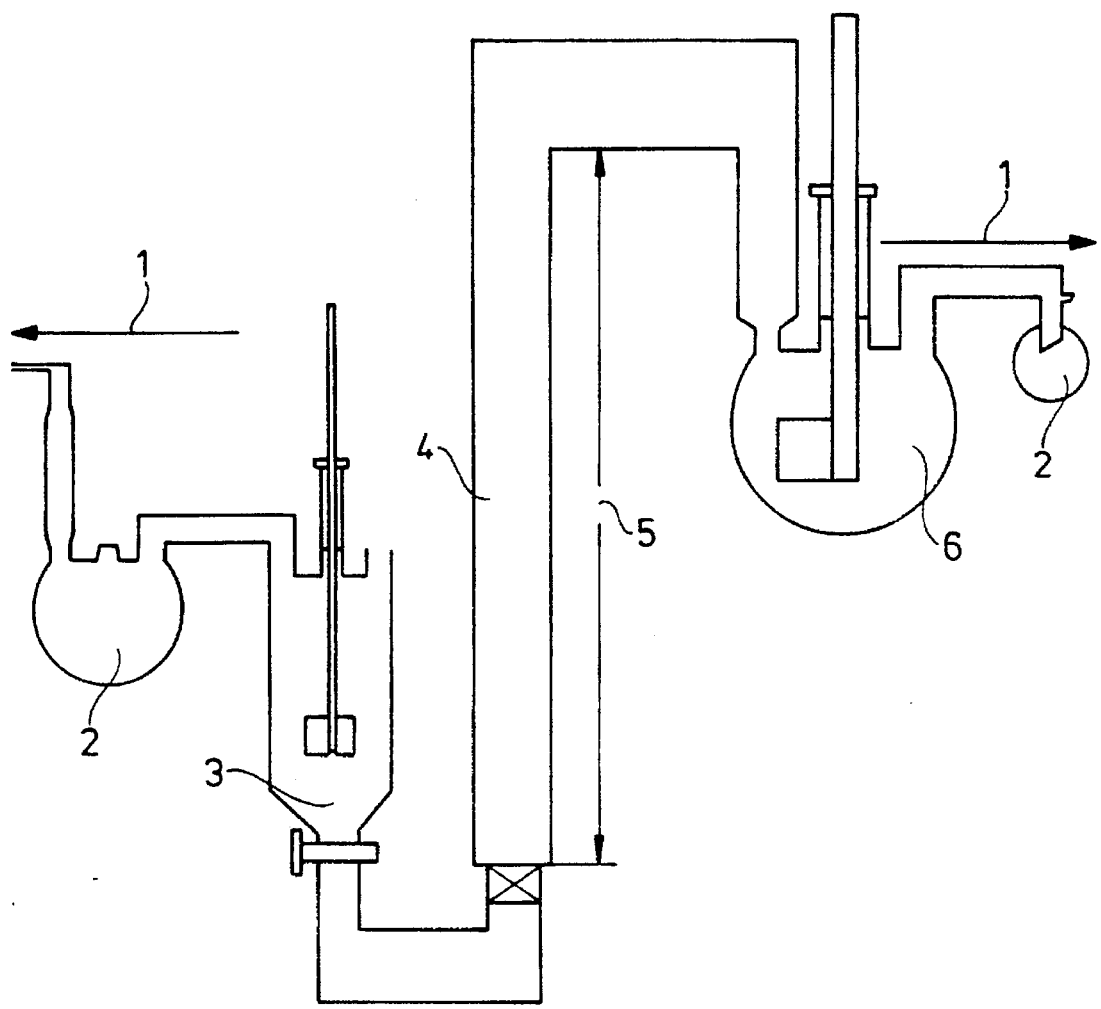

PROCESS FOR THE MANUFACTURE OF THERMOPLASTIC POLYCARBONATE

The present invention provides an at least two-stage melt process for the manufacture of solvent-free polycarbonate via the oligocarbonate intermediate, starting from aromatic diphenols and carbonic acid diaryl esters with the use of catalysts at temperatures between 80° C. and 400° C. and pressures of 1000 mbar to 0.01 mbar, which is characterized in that in the manufacture of the oligocarbonate intermediate at least one continuously operated tubular reactor is used.

The manufacture of aromatic oligo-/polycarbonates according to the melt transesterification process is known in the literature and previously described for example in the Encyclopedia of Polymer Science, Vol. 10 (1969), Chemistry and Physics of Polycarbonates, Polymer Reviews, H. Schnell, Vol. 9. John Wiley and Sons, Inc. (1964).

In the prior art, e.g. in JA 2-153 923, the manufacture of oligocarbonates by the batch mode of operation, and thus e.g. in a tank, is described. This mode of operation has the disadvantage of a large back-mixing and accordingly a wide residence-time behaviour, which leads to a relatively long residence time and accordingly to a heightened thermal damage to the product. It has now been found that the evaporation-off of the monophenol in the polycarbonate transesterification process to give the oligocarbonate can be operated with small back-mixing in a continuously operated tubular reactor.

Oligocarbonates for the purposes of the present invention are those with mean weight-average molecular weights $\overline{M}_w$ of 750 to 10,000, preferably of 1000 to 7000, determined by measurement of the relative solution viscosity in dichloromethane or in mixtures of equal parts by weight of phenol and o-dichlorobenzene, calibrated by light scattering.

Diphenols suitable for the process according to the invention are those of formula (I),

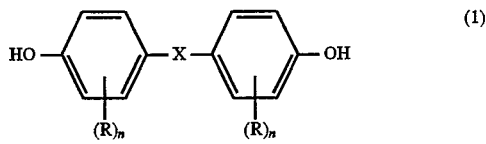

wherein

X=$C_1$–$C_8$-alkylidene or cycloalkylidene, S or a single bond and

R =$CH_3$, Cl or Br and n is 0, 1 or 2,

Preferred diphenols are e.g.:
4,4'-dihydroxydiphenyl,
4,4'-dihydroxydiphenyl sulphide,
2,2-bis(4-hydroxyphenyl)propane,
2,2-bis(3,5-dimethyl-4-hydroxyphenyl)propane,
2,2-bis(3,5-dichloro-4-hydroxyphenyl)propane,
2,2-bis(3,5-dibromo-4-hydroxyphenyl)propane,
1,1-bis(4-hydroxyphenyl)cyclohexane and
1,1-bis(4-hydroxyphenyl)-3,3,5-trimethylcyclohexane.

Particularly preferred diphenols from those aforementioned are 2,2-bis(4-hydroxyphenyl)propane and 1,1-bis(4-hydroxyphenyl)-3,3,5-trimethylcyclohexane.

The aforementioned diphenols can be used for the manufacture of homo- or copolymers.

Carbonic acid diesters for the purposes of the present invention are di-$C_6$–$C_{20}$-aryl esters, preferably the diesters of phenol or alkyl-substituted phenols, thus diphenyl carbonate or e.g. dicresyl carbonate. The carbonic acid diesters are used in an amount of 1.01 to 1.30 mol, preferably 1.02 to 1.15 mol, relative to 1 mol bisphenol.

Care must be taken that the reaction components for the first stage (oligocarbonate synthesis), that is the diphenols and the carbonic acid diaryl esters, are free from alkali metal and alkaline earth metal ions, amounts of less than 0.1 ppm of alkali metal and alkaline earth metal ions being tolerable. Diphenols or carbonic acid diaryl esters of such purity are obtainable by recrystallizing, washing and/or distilling the carbonic acid diaryl esters or diphenols. In the process according to the invention the content of alkali metal and/or alkaline earth metal ions both in the diphenol and in the carbonic acid diester should have a value of less than 0.1 ppm. The total chlorine content of the raw materials should not exceed a value of 2 ppm and the content of saponifiable chlorine of the carbonic acid diester should not exceed a value of 0.05 ppm.

The polycarbonates can be branched deliberately and in a controlled manner by the use of small amounts of branching agents. Some branching agents are:
phloroglucinol,
4,6-dimethyl-2,4,6-tri(4-hydroxyphenyl)heptene-2,
4,6-dimethyl-2,4,6-tri(4-hydroxyphenyl)heptane,
1,3,5-tri(4-hydroxyphenyl)benzene,
1,1,1-tri(4-hydroxyphenyl)ethane,
tri(4-hydroxyphenyl)phenylmethane,
2,2-bis[4,4-bis(4-hydroxyphenyl)cyclohexyl]propane,
2,4-bis(4-hydroxyphenylisopropyl)phenol,
2,6-bis(2-hydroxy-5'-methylbenzyl)-4-methylphenol,
2-(4-hydroxyphenyl)-2-(2,4-dihydroxyphenyl)propane,
hexa(4-(4-hydroxyphenylisopropyl)-phenyl orthoterephthalic acid,
tetra(4-hydroxyphenyl)methane,
tetra(4-(4-hydroxyphenylisopropyl)phenoxy)methane,
1,1-bis(4',4"-dihydroxytriphenyl)methyl)benzene and in particular
α,α',α"-tris(4-hydroxyphenyl)-1,3,5-triisopropylbenzene.

Further possible branching agents are 2,4-dihydroxybenzoic acid, trimesic acid, cyanuric chloride and 3,3-bis(3-methyl-4-hydroxyphenyl)-2-oxo-2,3-dihydroindole.

The 0.05 to 2 mol %, relative to the diphenols used, of branching agents for optional concomitant use can be fed together with the diphenols.

Catalysts for the purposes of the process according to the invention are all inorganic and organic basic compounds, for example lithium, sodium, potassium, caesium, calcium, barium and magnesium hydroxides, carbonates, halides, phenolates, diphenolates, fluorides, acetates, phosphates, hydrogen phosphates, boranates, nitrogen and phosphorus bases, as for example tetramethylammonium hydroxide, tetramethylammonium acetate, tetramethylammonium fluoride, tetramethylammonium tetraphenylboranate, tetraphenylphosphonium fluoride, tetraphenylphosphonium tetraphenylboranate, dimethyldiphenylammonium hydroxide, tetraethylammonium hydroxide, DBU, DBN or guanidine systems such as for example 1,5,7-triazabicyclo [4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidene-di-1,5,7-triazabicyclo[4.4.0]dec-5-ene, 7,7'-decylidene-di-1,5,7-triazabicyclo[4.4.0]dec-5-ene and 7,7'-dodecylidene-di-1,5,7-triazabicyclo[4.4.0]dec-5-ene or phosphazenes such as for example the phosphazene base $P_1$-t-oct=tert-octyliminotris(dimethylamino)phosphorane, the phosphazene base $P_1$-t-butyl=tert-butyliminotris (dimethylamino)phosphorane and BEMP=2-tert-butylimino-2-diethylamino-1,3-dimethylperhydro-1,3-diaza-2-phosphorin.

Preferred catalysts for the purposes of the process according to the invention for the preparation of the oligocarbonate intermediate are compounds of the general formulae (2) and (3):

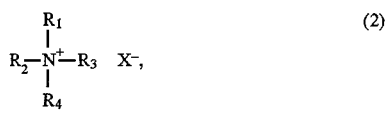 (2)

 (3)

wherein $R_1$ to $R_4$ can be the same or different alkyls, aryls or cycloalkyls and $X^-$ can be an anion for which the corresponding acid-base pair $H^+ + X^- = HX$ has a $pK_B$ of less than 11.

These catalysts are used in amounts of $10^{-2}$ to $10^{-8}$ mol, relative to 1 mol diphenol.

The catalysts can also be used in combination (of two or more) with each other.

In the case that alkali metal/alkaline earth metal catalysts are used it can be advantageous to add the alkali metal/alkaline earth metal catalysts at a later time (e.g. after the oligocarbonate synthesis during the polycondensation in the second stage). The alkali metal/alkaline earth metal catalysts can then be added e.g. as solid or as a solution in water, phenol, oligocarbonate or polycarbonate or as a masterbatch in the preceding substances. The concomitant use of alkali metal or alkaline earth metal catalysts does not contradict the aforementioned requirement for purity of the reactants.

The conversion reaction to the oligocarbonate from the aromatic dihydroxy compound and the carbonic acid diester in the melt is preferably itself carried out in two stages. In the first stage the fusion of the aromatic dihydroxy compound and of the carbonic acid diester takes place at temperatures of 80° to 250° C., preferably 100° to 230° C. particularly preferably 120° to 190° C. under normal pressure in 0.1 to 5 hours, preferably 0.25 to 3 hours. If the raw materials are metered as liquid this first step of the process operation is omitted.

After addition of the catalyst, the oligocarbonate is produced in the second stage by distillation-off of the monophenol.

The reaction of the aromatic dihydroxy compound and the carbonic acid diester to the oligocarbonate is carried out in one tubular reactor or if necessary in several tubular reactors connected in parallel or in several tubular reactors connected in series, which are operated continuously in the range of 180° to 250° C. at 1 bar to 5 mbar, preferably at 190° to 230° C. at 800 mbar to 10 mbar. One to three reactors is the ideal.

It is advantageous to subject the precondensate of the aromatic dihydroxy compound and the carbonic acid diester before entry into the tubular reactor to an isothermal intermediate degassing (flash of the monophenol).

Tubular reactors suitable according to the invention are vertically upright apparatuses with heat exchange surfaces, e.g. an externally heated tube with a heatable static mixer or cross-grating heat exchanger. According to the invention tube-bundle heat exchangers are preferred, with or without packing. Gas/liquid separators are connected downstream of the tubular reactor or reactors. The heat-exchange surfaces are so designed that the monophenol being released during the reaction can be vaporized. The process is operated in such a way that the product enters the tubular reactor from below. A pressure profile is therefore present in the reactor owing to the liquid column diminishing in the upward direction. The energy can be supplied in one or more heating zones, and preferably in countercurrent.

The melt viscosity of the oligocondensation in the tubular reactor to be used according to the invention falls in the range from $eta_m = 1$ to 10,000 mPa.s, preferably in the range from $eta_m = 5$ to 5000 mPa.s.

The polycondensation of the oligocarbonate to the polycarbonate is carried out by further raising of the temperature to 250° to 400° C., preferably to 270° to 360° C., especially at 280° to 320° C. and a pressure of less than 100 bar to 0.01 mbar.

The molecular weights of the oligocarbonates are governed by the desired final viscosity of the polycarbonates; thus by the condensation of low-molecular oligocarbonates, low-molecular polycarbonates are obtained and by the condensation of relatively high-molecular oligocarbonates, relatively high-molecular polycarbonates are obtained.

The last step, the polycondensation, is preferably carried out in short times of less than 1 h, preferably less than 30 min. High-viscosity reactors are suitable for this, in particular simple disc reactors and high-viscosity disc reactors, kneaders, screw machines, accordingly e.g. a screw kneader.

The aromatic polycarbonates obtainable according to the invention should have mean weight-average molecular weights $M_w$ of 18,000 to 60,000, preferably of 19,000 to 40,000, determined by measurement of the relative solution viscosity in dichloromethane or in mixtures of equal parts by weight of phenol and o-dichlorobenzene, calibrated by light scattering.

The OH end-group contents of the polycarbonates should be less than 30%, preferably less than 25%, particularly preferably less than 20% and especially less than 10%, relative to 100% of the total end groups of the polycarbonate.

The oligocarbonates can also be isolated, e.g. granulated, and thereafter polycondensed in a separate step. For limitation of the weight-average molecular weights $M_w$ of the polymers, molecular-weight regulators, such as e.g. alkylphenol, can be used in known manner (EP 360 578) in the calculated amounts.

For the improvement of the properties, auxiliary substances and reinforcing substances can be admixed with the polycarbonates manufactured according to the invention. Substances which can be considered include among others: stabilizers, flow aids, mould release agents, fireproofing agents, pigments, finely divided minerals, fibrous materials, e.g. alkyl and aryl phosphites, phosphates and phosphanes, low-molecular carboxylic acid esters, halogen compounds, salts, chalk, quartz flour, and glass and carbon fibres.

Other polymers, furthermore, e.g. polyolefins, polyurethanes or polystyrenes, can also be admixed with the polycarbonates according to the invention.

These substances are preferably added in conventional units to the finished polycarbonate but can also be added, according to the requirements, during the manufacture by the process according to the invention.

Beyond that, for particular applications the modification of the polycarbonates by the incorporation by condensation of blocks, segments and comonomers is also possible, e.g. the incorporation of siloxane blocks with phenolic OH end groups, of aromatic and aliphatic polyesters with phenolic OH and carboxylic acid end groups, of polyphenylene sulphide blocks with OH end groups and of polyphenylene oxide blocks with OH end groups and similar polymers with phenolic OH end groups.

In the attached diagram the numbers have the following meanings:
1. Vacuum pump
2. Phenol
3. Precondensate 4. Heated-jacket tubular reactor
5. 40 cm and
6. Oligocarbonate.

EXAMPLES

Example 1

In a storage vessel (heated by an oil jacket), 913.2 g bisphenol A (4.0 mol) and 856.8 g diphenyl carbonate (4.0 mol) are fused at 150° C. and 0.02634 g tetraphenylphosphonium tetraphenylboranate (0.001 mol %) are added. After heating to 200° C. and a 30 min residence time, the precondensate is heated to 220° C. and, as a result of application of vacuum (100 mbar), phenol is distilled off during the course of 35 min. Thereafter the product ($eta_{rel.}$ 1.020, $eta_m$ 23 mPa.s) is continuously charged from below at 500 g/h into a tubular reactor (40 cm long and 3.5 cm in diameter), heated by a jacket (230° C.). The applied vacuum is 60 mbar. In the course of this, bubbles of liberated phenol, partly fine and pearly and partly mushroom-shaped, are formed in the melt. The viscous oligocarbonate ($eta_{rel.}$= 1.035, $eta_m$ 110 mPa.s) then flows into the collecting flask. The oligocarbonate obtained from the aforesaid apparatus is transferred to a stirred flask with attached column and the vacuum improved stepwise as far as to 1 mbar and the temperature at the same time raised to 260° C. A light-coloured solvent-free oligocarbonate with a relative solution viscosity of 1.157 (dichloromethane, 25° C., 5 g/l) is then obtained. NaOH ($5 \times 10^{-4}$ mol % relative to bisphenol A) is now added to the oligocarbonate as a 1% aqueous solution and the oligocarbonate stirred at 280° C. and 0.1 mbar for 1.5 hours. A light-coloured solvent-free polycarbonate with a relative solution viscosity of 1.305 (dichloromethane, 25° C., 5 g/l) is obtained. The phenolic OH value of the polycarbonate is 220 ppm.

Example 2

As Example 1, except that the precondensate is now prepared at 210° C. and 200 mbar ($eta_{rel.}$=1.015, $eta_m$=3 mPa.s). After passage through the tubular reactor an oligocarbonate with an $eta_{rel.}$=1.023, $eta_m$=25 mPa.s is obtained.

Example 3

As Example 1, except that the precondensate is prepared at 220° C. and 150 mbar ($eta_{rel.}$=1.019, $eta_m$=10 mPa.s). After passage through the tubular reactor an oligocarbonate with an $eta_{rel.}$=1.025, $eta_m$=30 mPa.s is obtained.

We claim:

1. Process for the manufacture of aromatic polycarbonate via an oligocarbonate intermediate having a mean molecular weight $M_w$ of 750 to 10,000 by at least two-stage melt transesterification starting from diphenols and carbonic acid diaryl esters with the use of catalysts at temperatures between 180° C. and 250° C. and pressures of 1 bar to 5 mbar, the method including the step of utilizing at least one continuously operated tubular reactor in the manufacture of the oligocarbonate intermediate, vertically mounting the at least one continuously operated tubular reactor, supplying product to the reactor from below, passing product through the reactor in a product stream, and passing a heating stream through the reactor countercurrent to the product stream, and wherein the melt viscosity of the oligocondensation in the reactor falls in the range from $eta_m$=1 to 10,000 mPa.s.

2. Process according to claim 1, characterized in that the tubular reactor is operated at 190° to 230° C. and 800 mbar to 10 mbar.

3. Process according to claim 1, characterized in that the oligocondensation proceeds in an $eta_m$ range of 5 to 5000 mPa.s.

* * * * *